(12) United States Patent
Azai

(10) Patent No.: US 6,791,787 B2
(45) Date of Patent: Sep. 14, 2004

(54) TAPE GUIDE DEVICE

(75) Inventor: Kouji Azai, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 56 days.

(21) Appl. No.: 10/367,788

(22) Filed: Feb. 19, 2003

(65) Prior Publication Data

US 2004/0160699 A1 Aug. 19, 2004

(30) Foreign Application Priority Data

Feb. 18, 2002 (JP) ........................................ 2002-040123

(51) Int. Cl.⁷ ............................................ G11B 5/027
(52) U.S. Cl. ...................................................... 360/85
(58) Field of Search ............................................ 360/85

(56) References Cited

U.S. PATENT DOCUMENTS 4,697,214 A * 9/1987 Sasakawa ..................... 360/85
5,583,714 A * 12/1996 Nawa et al. .................. 360/85

* cited by examiner

Primary Examiner—A. J. Heinz
(74) Attorney, Agent, or Firm—Wenderoth, Lind & Ponack, L.L.P.

(57) ABSTRACT

Disclosed is an improvement in a tape guide device having an inclined post and a guide roll rising upright on its base for guiding and directing a length of recording tape to the rotary drum on the deck of a video recorder. The base is made of a synthetic resin material, and has an axle hole made therein for press-fitting the axle of the guide roll. The upper end of the axle hole is tapped, and the axle hole has at least one rib projecting inward from its inner circumference. The axle is threadedly engaged with the upper end of the axle hole, and is press-fitted in the axle hole with the rib or ribs pressed and slightly deformed. Thus, the axle can be positively held in the axle hole of the base, preventing the guide roll to shake in the axle hole, still permitting adjustment of the height of the guide roll. Thanks to such ribs the tight insertion of the axle in the axle hole is assured without the necessity of machining or molding with high precision.

3 Claims, 7 Drawing Sheets

TAPE GUIDE DEVICE

BACKGROUND OF THE INVENTION

1. Field of the Invention

The present invention relates to a tape guide device having an inclined post and a guide roll rising upright on its base for guiding and directing a length of recording tape from a videocassette to the rotary drum on the deck of a video recorder, so that the length of recording tape may traverse the rotary drum.

2. Related Art

As is well known, the rotary drum is inclined at a predetermined angle relative to the deck of a video recorder. The length of tape is applied to the rotary drum over approximately 180 degrees. When the rotary drum rotates at a high constant speed, the length of tape runs at a predetermined speed to send and receive signals from the magnetic heads, which are mounted on the circumference of the drum for recording and reproducing signals.

Referring to FIG. 6, the length of tape 2 is applied to the rotary drum 1 on the deck of a video recorder. For applying the length of tape 2 fed from a videocassette 3 to the rotary drum 1 a first stationary post 4, first tension posts 5, a first guide roll 6 and a first inclined post 7 are arranged on the order named on the tape-feeding side A. Likewise, a second inclined post 7, a second guide roll 6, a pinch roll-and-capstan 8 and 9, and a second stationary post 4 are arranged on the order named on the tape-winding side B.

Referring to FIG. 7, each tape guide roll 6 is rotatably mounted to a die casting base 10. Specifically the base 10 has an axle hole made therein, and the axle of the guide roll 6 is inserted in the axle hole. The axle is fastened by a screw, which is tightened by applying such a controlled torque that the slipping-off of the axle from the axle hole may be prevented, still permitting adjustment of the guide roll in respect of height.

The axle, however, is apt to loosen or shake in the axle hole, owing to the clearance between the axle and the inner circumference of the axle hole. With a view to prevent the axle from growing loosely or shaking in the axle hole an extra lock screw is used. Even though the base is made of a synthetic resin material of high-strength in place of die-casting, the base needs use of the lock screw.

In the hope of reducing such loosing problem the axle hole of the base is somewhat smaller in diameter than the axle of the guide roll, and the axle is press-fitted in the axle hole of the base. This remedy, however, requires the strict precision of making axles and axle holes, and it is almost impossible to insert the axle into the full length of the axle hole. As a matter of fact, insertion of the axle into the axle hole is limited to a very short distance.

The axle hole is so made that a very short length of the hole is somewhat smaller in diameter than the axle of the guide roll, and that the remaining length of the hole is somewhat larger in diameter than the axle, leaving a small annular clearance between the axle and the inner circumference of the hole. The axle is press-fitted in the axle hole of the base, and then, the axle is tilted more or less about the very short length of the hole where the axle is tightly gripped. As a result the length of tape is caught by one of the flanges 11a and 11b between which the guide roll 6 is rotatably sandwiched. Then, the length of tape is damaged or is prevented from running at a controlled speed.

In view of the above one object of the present invention is to provide a tape guide device whose guide roll is guaranteed to be free of shaking, assuring the stable tape running, and facilitating precise height-adjustment of the guide roll without requiring any strict boring of the base relative to the axle size.

SUMMARY OF THE INVENTION

To attain this object a tape guide device having an inclined post and a guide roll rising upright on its base for guiding and directing a length of recording tape fed from a videocassette to the rotary drum on the deck of a video recorder, is improved according to the present invention in that the base is made of a synthetic resin material, and has an axle hole made therein for press-fitting the axle of the guide roll, the upper end of the axle hole being tapped, and the axle hole having at least one rib projecting inward from its circumference, thus making the axle threadedly engaged with the upper end of the axle hole to be press-fitted in the axle hole with the rib or ribs pressed and slightly deformed.

Two ribs may be formed apart from each other on the inner circumference of the axle hole on the side opposite to the inclined post. Otherwise, two ribs may be formed apart from each other on the inner circumference of the axle hole on the same side as the inclined post.

The tape guide device is basically similar to the conventional one in structure; the axle of the guide roll is press-fitted in the axle hole of the resin base.

The feature of the tape guide device resides in two ribs being formed on the inner circumference of the axle hole. The axle is press-fitted in the axle hole while deforming the ribs projecting from the inner surface of the axle hole, thereby assuring that the axle is inserted into the substantial depth of the axle hole in the tight gripping condition. Thanks to the deformable ribs the boring allowance relative to the axle size is less strict than that which is required in boring the base of the conventional tape guide device.

Other objects and advantages of the present invention will be understood from the following description of a tape guide device according to one preferred embodiment of the present invention, which is shown in accompanying drawings.

DETAILED DESCRIPTION OF PREFERRED EMBODIMENT

Figure 1:
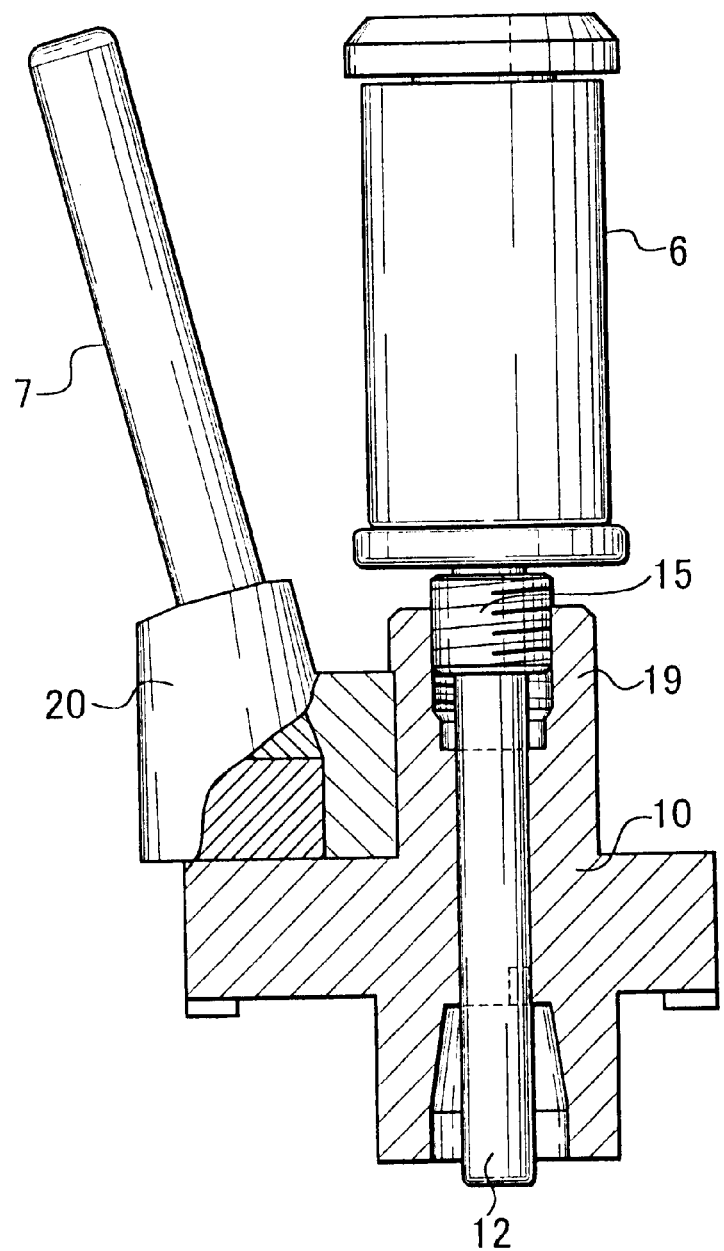
FIG. 1 illustrates a tape guide device according to one embodiment of the present invention partly in section.

Referring to FIG. 1, a tape guide device according to the present invention comprises a guide roll 6, an inclined post 7 and a base 10. The guide roll 6 can rotate as a length of recording tape runs on the guide roll 6, and the inclined post 7 is inclined at the same angle as the rotary drum 1. The base 10 is made of a very hard resin, and it has an axle hole made therein. The axle 12 of the guide roll 6 is press-fitted into the axle hole 13 of the base 10, and likewise the inclined post 7 is press-fitted into the post hole 21 of the base 10. The tape guide device is similar in appearance to the conventional one.

Figure 2A:
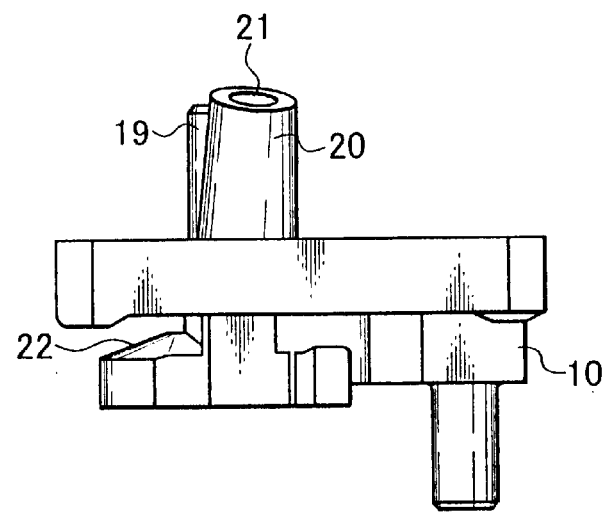
FIGS. 2 (a) and (b) show the resin base of the tape guide device as viewed from the side and top of the base, respectively.
Figure 2B:
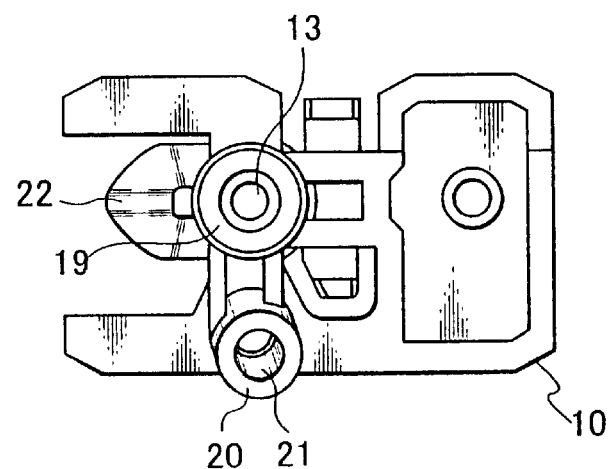

Referring to FIG. 2, the resin base 10 is an injection-molded article, and it has two projections 19 and 20 formed on its upper surface. The axle hole 13 is made in the upright projection 19 for press-fitting the axle 12 of the guide roll 6 whereas the post hole 21 is made in the inclined projection 20 for press-fitting the inclined post 7. A nose 22 formed on the forward end of the base 10.

Figure 3:
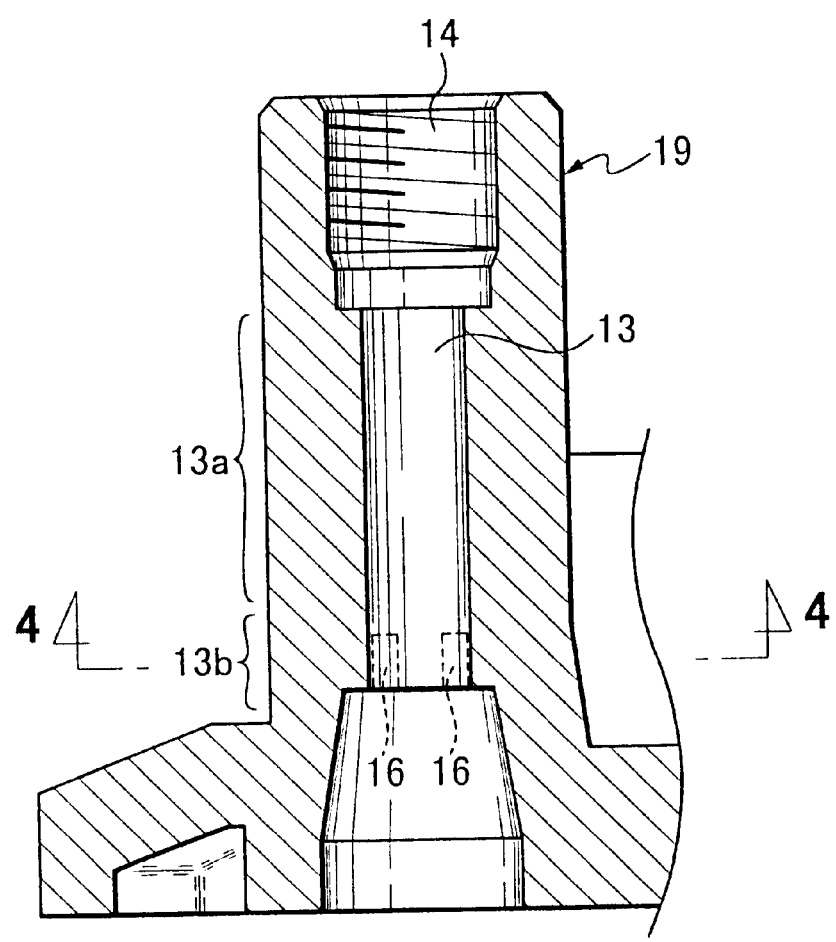
FIG. 3 is a longitudinal section of a fragment of the base, showing the axle hole in which the axle is to be press-fitted.

FIG. 3 illustrates, in section, the axle hole 13, into which the axle 12 of the guide roll 6 is to be press-fitted. The axle hole 13 has its upper section 14 tapped, and the axle 12 has male threads formed on its upper end to threadedly engage with the upper, tapped section 14 of the axle hole 13. The height of the guide roll 6 can be adjusted in respect of the engagement length of the male and female threads. As shown, the enlarged, tapped section 14 of the axle hole 13 is concentric with the subsequent section of the axle hole 13, and the axle hole 13 has two ribs 16 formed on its inner surface, projecting inward.

The axle hole 13 is composed of a linear axle hole section 13a and a rib-formed axle hole section 13b. The diameter of the linear axle hole section 13a is equal to that of the rib-formed axle hole section 13b.

Figure 4:
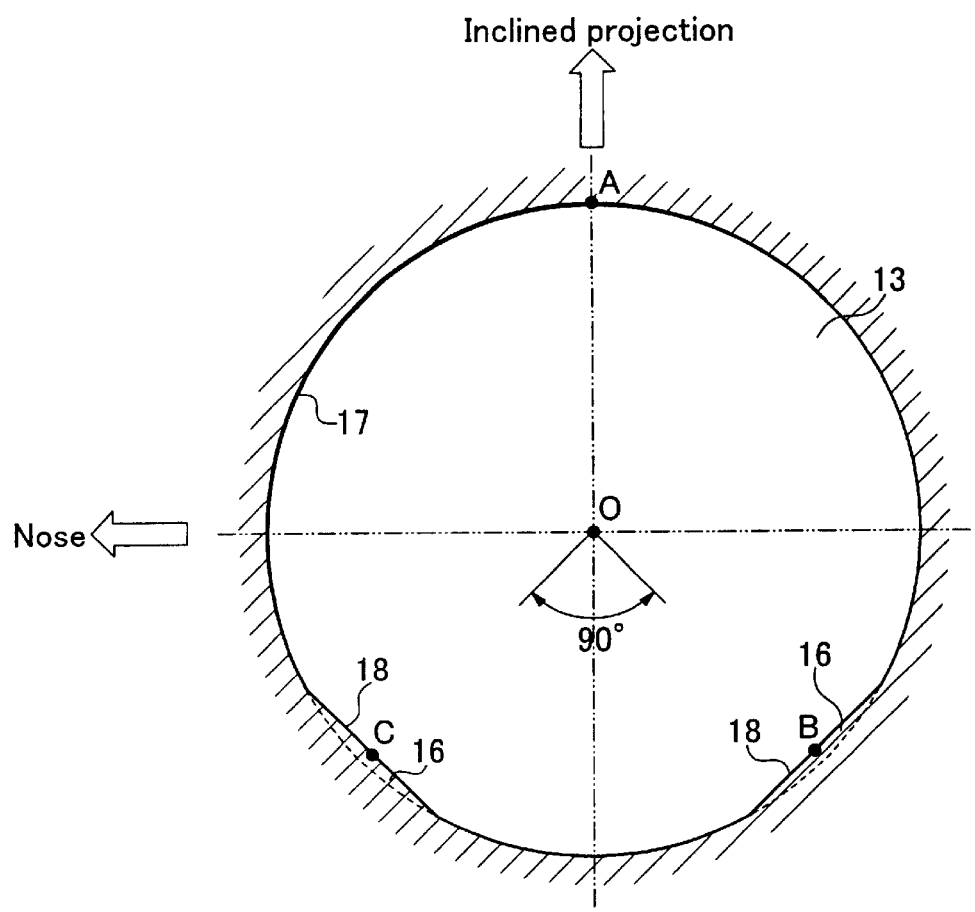
FIG. 4 is a cross section taken along the line 4—4 in FIG. 3.

FIG. 4 is an enlarged sectional view taken along the line A—A in FIG. 3 as viewed from the bottom side of the base 10. Two ribs 16 are formed on the inner circumference of the axle hole 13. Each rib 16 has a flat surface 18 formed on its upper side. When the axle 12 is pushed into the linear axle hole section 13a, the flat surfaces of the ribs 16 are deformed; the axle 12 abuts the inner circumference of the axle hole 13 at three points A, B and C, and therefore the axle 12 is stabled in the axle hole 13. The axle 12 can be smoothly inserted in the linear axle hole section 13a while deforming the ribs 16.

Two ribs 16 are shown in which directions they are formed with respect to the nose. They are formed to be apart 90 degrees from each other on the side opposite to the inclined post 7. The lower end of the axle 12 abuts three points A, B and C, and therefore, even if the linear hole section 13a has a significant gap left between the inner circumference and the axle 12, the axle 12 cannot incline in any direction other than the inter-rib direction.

Such slight inclination toward the inter-rib direction may be caused as a counter action to application of the length of tape 2 to the guide roll 6. The axle 12 cannot be inclined toward the point A because the ribs 16 and 16 push the axle 12 against the point A all the time. The ribs 16 may be formed close to the upper end of the axle hole 13 (not shown). When the ribs 16 are formed close to the upper end of the axle hole 13, the ribs 16 are formed on the same side as the inclined post 7.

Figure 5A:
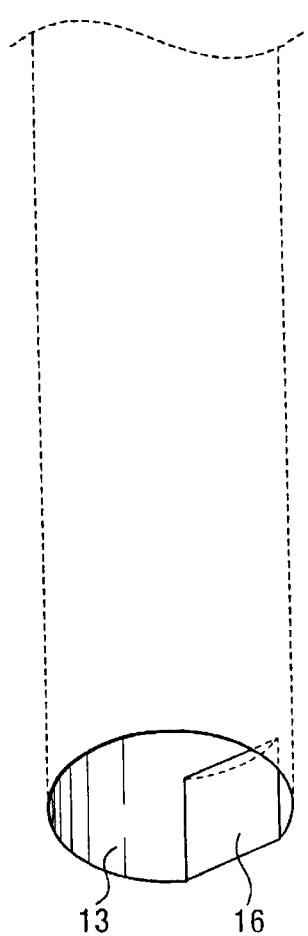
FIG. 5 (a) shows an axle hole having a single rib formed on its inner circumference, and FIG. 5 (b) shows an axle hole having three ribs formed on its inner surface.
Figure 5B:
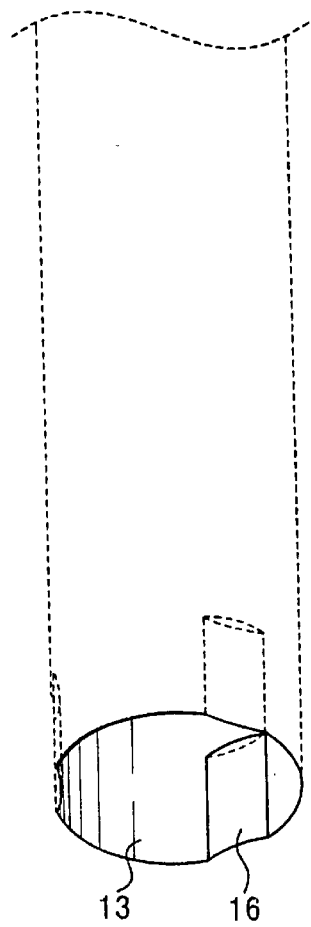
Figure 6:
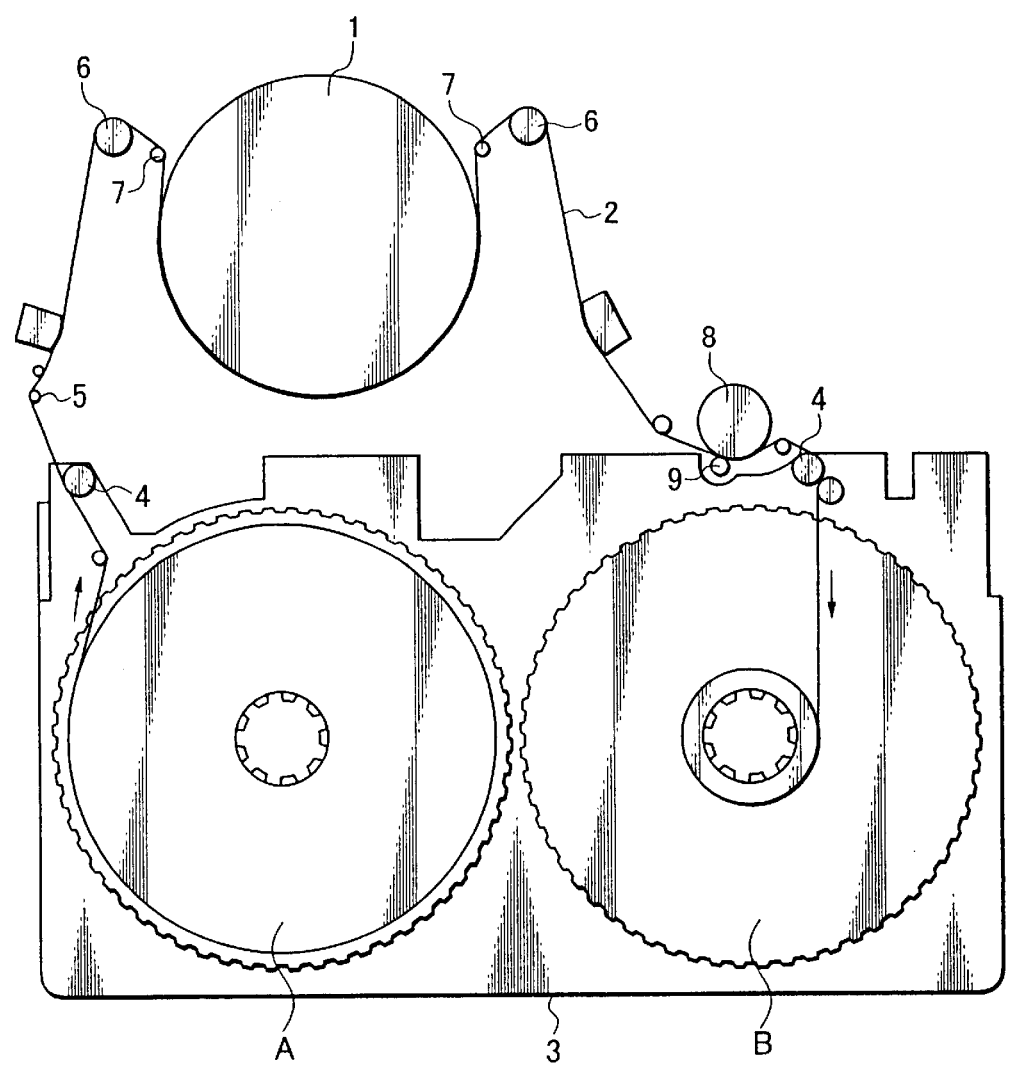
FIG. 6 is a top view of the deck of a video recorder, showing the course on which a length of tape runs.
Figure 7A:
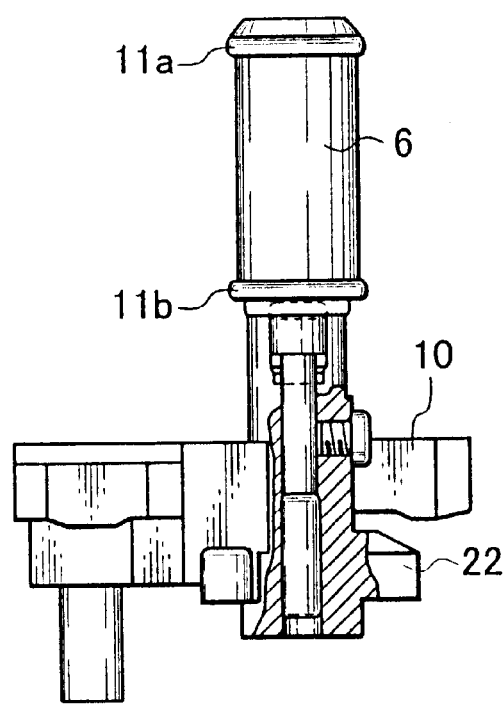
FIGS. 7 (a) and (b) show a conventional tape guide device as viewed from the side and top of the device, respectively.
Figure 7B:
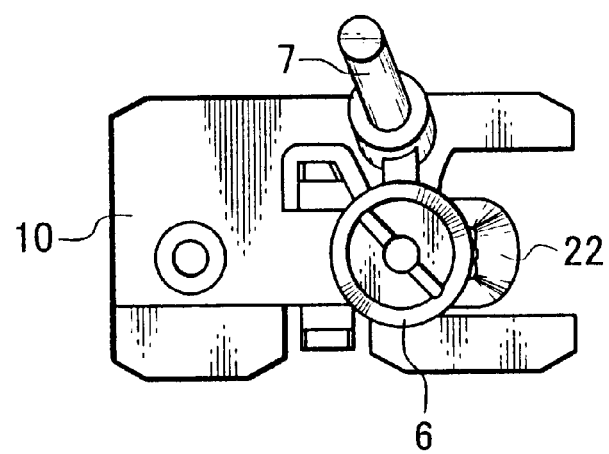

Ribs 16 can be formed over the full length of the axle hole 13. Referring to FIG. 5, a single rib 16 is formed on the lower end of the inner surface of the axle hole 13 (FIG. 5a) whereas three ribs 16 are formed on the lower end of the inner surface of the axle hole 13 (FIG. 5b). These ribs can be slightly deformed on their flat surfaces 18 to positively grip the axle 12 of the guide roll 6, not allowing the guide roll 6 to shake in the axle hole 13. When the height of the guide roll 6 is adjusted, such deformed surfaces allows the axle 12 to rise or descend in the axle hole 13, still providing a good resistance to rotation of the axle 12 when the length of recording tape traverses the guide roll 6.

Ribs 16 formed on the inner surface of the axle hole 13 of a hard resin base 10 according to the present invention provide the following advantages:

fastening screws to prevent the axle 12 from slipping off from the axle hole 13 are not required;

the axle 12 when press-fitted in the axle hole 13 is held in correct position thanks to holding the axle 12 at plural stationary points on the inner surface of the axle hole 13;

allowance between the axle surface and the inner surface of the axle hole 13 can be less strict thanks to presence of ribs 16 projecting inward from the inner surface of the axle hole 13;

arrangement of ribs 16 can be determined relative to the nose of the base 10 to control inclination of the axle 12 of the guide roll 6 in respect of in which direction the axle 12 is inclined, thereby preventing the length of recording tape from shaking on the guide roll 6; and adjustment of the height of the guide roll 6 can be made without causing the axle 12 to loose in the axle hole 13, thus assuring that the guide roll 6 stands stable.

What is claimed is:

1. A tape guide device having an inclined post and a guide roll rising upright on its base for guiding and directing a length of recording tape fed from a videocassette to the rotary drum on the deck of a video recorder, characterized in that the base is made of a synthetic resin material, and has an axle hole made therein for press-fitting the axle of the guide roll, the upper end of the axle hole being tapped, and the axle hole having at least one rib projecting inward from its circumference, thus making the axle threadedly engaged with the upper end of the axle hole to be press-fitted in the axle hole with the rib or ribs pressed and slightly deformed.

2. A tape guide device according to claim 1, wherein two ribs are formed apart from each other on the side of the axle hole opposite to the inclined post.

3. A tape guide device according to claim 1, wherein two ribs are formed apart from each other on the same side of the axle hole as the inclined post.

* * * * *